United States Patent Office 3,341,710
Patented Sept. 12, 1967

3,341,710
SCANNER APPARATUS

Phillip J. Cade, Winchester, Mass., assignor to Electronics Corporation of America, Cambridge, Mass., a corporation of Massachusetts Filed Apr. 8, 1963, Ser. No. 271,418
8 Claims. (Cl. 250—239)

This invention relates to radiation sensing apparatus and more particularly to a scanner unit which includes a radiation source and a detector arranged to respond to radiation from the source that is reflected by a target.

Reflex scanners of the type to which this invention relates include a radiation source and a radiation sensor in the same housing, in which a beam of radiation from the source is reflected by a target back along the same path for detection by the sensor. Such scanners should be designed to operate properly in a range of applications over which the distance of the reflector from the scanner unit may vary substantially. Because of this application requirement and the necessity to collect as much reflected light as possible, the radiated beam conventionally is focused at infinity so that the outgoing rays are parallel. The rays strike a target which reflects them back along the same path into the housing. Conventionally, a half silvered mirror or other similar selective reflector has been interposed in the beam path within the housing for directing the reflected radiation onto a suitable detector disposed outside the path of the transmitted beam. Such units are relatively large and in many applications of reflex scanners of this type it is desirable to provide a smaller unit. Also the efficiency of radiation collection is decreased through the use of beam splitting techniques. A further problem encountered is the magnitude of the background signal.

Accordingly, it is an object of this invention to provide a new and improved reflex scanner unit.

Another object of the invention is to provide a reflex scanner unit of improved signal to noise ratio suitable for use with reflector targets variably spaced relative to the scanner unit which employs fixed beam focusing elements.

Still another object of the invention is to provide a more compact reflex scanner unit of greater efficiency than scanners heretofore available.

A further object of the invention is to provide in a reflex scanner unit novel and improved adjustment means which facilitates the alignment of the radiation source relative to the focusing system and the reflector target.

Still another object of the invention is to provide an improved reflex scanner unit arrangement which facilitates access to the radiation element for maintenance purposes.

Other objects, features and advantages of the invention will be seen as the following description of a preferred embodiment thereof progresses, in conjunction with the drawing, in which.

Figure 1:
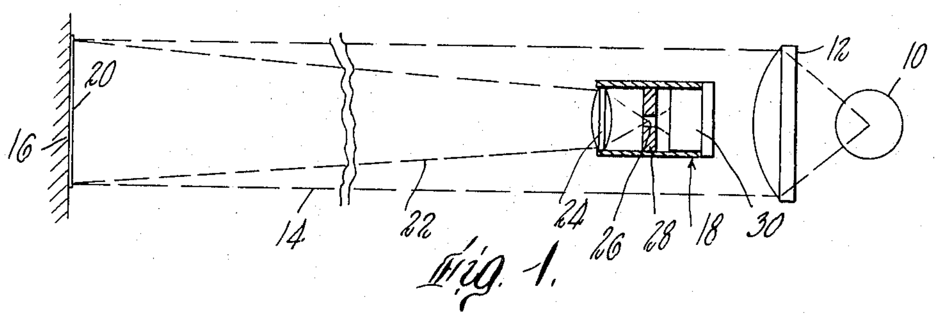
FIG. 1 is a diagrammatic illustration of the reflector scanning system of the invention.

The reflex scanner of the invention employs a lamp 10 as a source of radiation. Its output rays are focused by a plano-convex lens 12 at infinity to form a parallel beam 14 of radiation that is directed toward a target 16. Disposed in the center of beam path 14 is a sensor unit 18 of approximately one half the diameter of the beam so that the beam striking the target is annular in configuration. Such a "target" may move into the path of the beam 14 as for example, an article on a conveyor line in a manufacturing operation. The target carries a reflective medium 20 and when the reflective medium is aligned with the beam 14 of parallel rays from the light source 10, the radiation is reflected back along substantially the same path as annular beam 14. However, there is sufficient irregularity in commercially employed reflectors, such as corner reflectors or reflective tapes, to reflect a substantial amount of radiation along a solid beam path 22 to a second lens 24 of the convex-convex type which is disposed coaxially with beam 14 and focuses the reflected rays through an aperture 26 in plate 28 onto a photocell 30. This second lens and aperture combination is arranged to limit the field of view of the sensor unit 18 to less than 20°, and preferably less than 10°, so that the target position may be precisely identified.

This compact reflex scanning arrangement accommodates a scanning distance variation by a factor of five or more and with an appropriate radiation sensor 30 such as a cadmium selenide cell is more efficient than arrangements heretofore commercially employed for this purpose. This structure, in addition to being compact, sharply reduces the background signal due to source radiation other than that reflected from the target as the sensor 30 is easily shielded against direct or reflected radiation from the source 10 with the exception of reflections from the target element which are to be detected.

Figures 2, 3, 4, 5, 6:
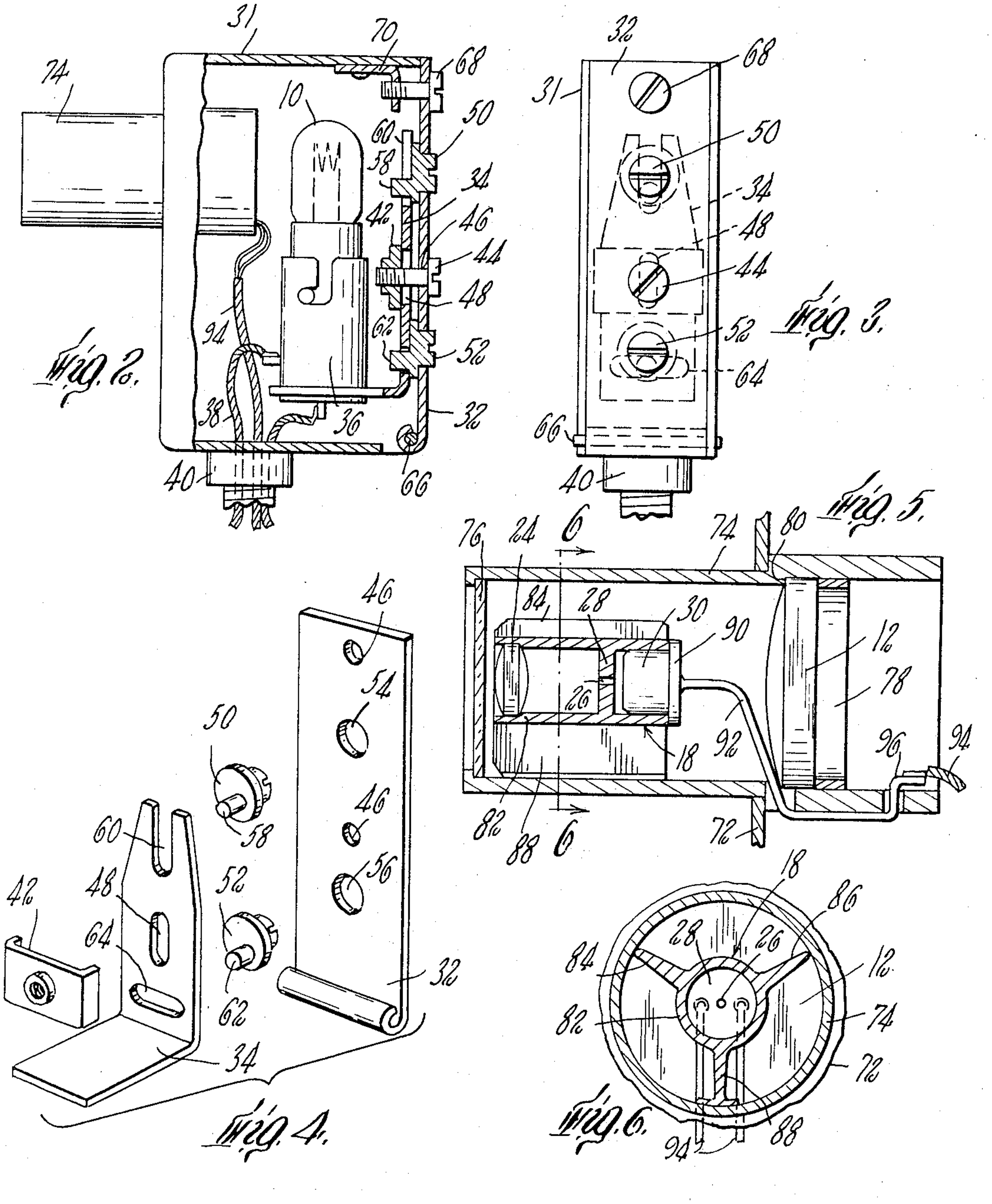
FIG. 2 is a side elevational view, in partial section, of the preferred embodiment of a reflex scanner unit constructed in accordance with the invention.
FIG. 3 is a rear elevational view of the reflex scanner unit of FIG. 2.
FIG. 4 is an exploded view of the mounting plate and radiation source support bracket illustrating the interrelation of the adjustment components.
FIG. 5 is a sectional view through the focusing and sensor component of the reflex scanner unit of FIG. 2.
FIG. 6 is a sectional view taken along the line 6—6 of FIG. 5.

With reference to FIGS. 2–6, the reflex scanner unit is housed in a rectangular casing 31 having a hinged rear wall 32 on which a lamp support plate 34 is mounted. The radiation source 10 is an incandescent lamp bulb secured in a conventional socket 36 on the support plate 34 and its energizing leads 38 are brought out from the casing 31 through a conduit connector element 40. The lamp support plate 34 is secured to the hinged wall 32 by a clamping member 42 and a bolt 44 which passes through aperture 46 in the hinged wall and a vertically disposed slot 48 in the support plate 34 .

The support plate 34 is adjustable in position in two directions, horizontally and vertically, and these adjustments are independent of one another. Cylindrical adjusting elements 50 and 52 are carried in circular apertures 54, 56 in the support wall 32. Adjusting element 50 has an eccentric stud 58 which is received in an open ended vertical slot 60 in the lamp support plate 34 that is aligned with slot 48. As the adjusting element 50 is rotated within aperture 54, the support plate 34 and support lamp 10 are moved in a generally horizontal direction. In similar manner cylindrical adjusting element 52 also has an eccentric stud 62 which is received in a horizontal slot 64 in the support plate below the clamping slot 48. Rotation of element 52 causes the support plate 34 and lamp 10 to move vertically as guided by slot 48. The two adjusting elements 50 and 52 are operable independently of each other, element 50 providing lateral adjustment of the source 10 and element 52 providing vertical adjustment. By means of these two independent adjustment elements the desired position of the source 10 relative to the lens 12 may be easily and quickly established.

The rear wall 32 of the housing 31, as indicated above, is hinged at its bottom for rotation about pin 66 so that the entire rear wall of the housing, including the lamp bulb carried by it, may be rotated out of the scanner housing for easy replacement of the bulb 10. The rear wall is secured in operative position by means of a bolt 68 which cooperates with a securing element 70 mounted in the top inner wall of the housing 31.

Disposed in front of the lamp 10 and carried by the front wall 72 of the casing 31 is a beam forming cylindrical tube 74 which carries a plano-convex focusing lens 12 at its rear end and a transparent protective member 76 at its forward end, with a coaxially disposed sensor unit 18 including the photocell 30, the apertured barrier element 28 and lens 24 between them. A retaining ring 78, mounted directly behind the lens 12, secures lens 12 in the cylindrical tube against a seat 80. The sensor unit elements are mounted in an inner cylindrical tube 82 which is supported coaxially with the axis of tube 74 by three thin webs 84, 86, 88. Photocell 30 is mounted so that its rear flange 90 seals the end of the cylindrical tube 82 and prevents light from source 10 entering at that point.

As indicated above, the slightly converting beam of reflected radiation enters tube 82 and is focused by lens 24 through the pin hole aperture 26 (0.015" in diameter) in plate 28 onto the sensitive surface of photocell 30. This optical system restricts the angular field of view of the photocell to slightly less than 5° and thus affords precision in the direction of the source of radiation that will be sensed by the photocell. The relatively delicate photocell leads 92 are secured to the outer cylinder 74 and main signal leads 94 connected at terminals 96 are brought out through the same conduit connection 40 as the light source energizing leads.

The invention provides a compact reflex scanner of increased efficiency, the cadmium selenide photocell being completely shielded from all direct or indirect radiation from the light source within the scanner housing, so that it is responsive only to radiation from an external point. This shielded arrangement provides an improved signal to noise ratio (of a magnitude in the order of twenty-five times), even though the sensitive area of the photocell is substantially less than in prior art systems. Uniform response is produced with target spacings over the entire range of four inches to eighteen inches. The several elements are coaxially disposed in a compact arrangement. In addition, the compact unit employs a standard lamp holder in an accessible mounting arrangement which facilitates positioning of the light source relative to the focusing and sensing system through independent lateral and vertical adjustment. Further, the entire design enables economical manufacture and simplified installation and maintenance of this reliable reflex scanner.

While a preferred embodiment of the invention has been shown and described, various modifications thereof will be apparent to those skilled in the art, and therefore it is not intended that the invention be limited to the disclosed embodiment or to details thereof, and departures may be made therefrom within the spirit and scope of the invention as defined in the claims.

I claim.

1. Apparatus for adjusting the relative positions of a radiation source and beam focusing means comprising:
- a housing,
- a radiation source mounted in said housing,
- beam focusing means disposed in front of said radiation source,
- and means to adjust the position of said radiation source relative to said focusing means including a support member having a first elongated slot and a second elongated slot disposed at right angles to said first slot,
- first camming means engaging said first slot to produce movement of said first support member in a direction generally parallel to said second slot,
- second camming means engaging said second slot to produce movement of said support member in a direction generally parallel to said first slot,

- and clamping means for securing said radiation source and said focusing means in an adjusted position relative to one another as controlled by said first and second camming means.

2. Apparatus for adjusting the relative positions of a light source and beam focusing means comprising:
- a housing,
- an incandescent light source mounted in said housing,
- beam focusing means disposed in front of said light source,
- and means to adjust the position of said light source relative to said focusing means including a source support member having a first elongated slot and a second elongated slot disposed at right angles to said first slot,
- first rotatable camming means including an eccentrically positioned stud engaging said first slot to produce movement of said first support member in a direction generally parallel to said second slot,
- second rotatable camming means including an eccentrically positioned stud engaging said second slot to produce movement of said support member in a direction generally parallel to said first slot,
- and clamping means for securing said light source and said focusing means in an adjusted position relative to one another as controlled by said first and second camming means.

3. The apparatus as claimed in claim 2 wherein said housing has a wall portion hingedly mounted for pivoting movement outwardly from said housing and said support structure is mounted on said wall portion such that said source may be moved out of said houisng by movement of said hinged wall portion to facilitate replacement of said radiation source.

4. A reflex scanner for sensing self-generated externally reflected radiation comprising:
- a housing,
- a radiation source mounted in said housing,
- focusing means fixed in position in front of said radiation source for forming a parallel beam of rays from said source,
- and means to adjust the position of said radiation source relative to said focusing means including a source support member having a first elongated slot, a second elongated slot disposed at right angles to said first slot, and a third elongated slot disposed between said first and second slots and extending parallel to said second slot,
- first rotatable camming means including an eccentrically positioned stud engaged said first slot to produce movement of said radiation source in a direction generally parallel to said second slot,
- second rotatable camming means including an eccentrically positioned stud engaging said second slot to produce movement of said radiation source in a direction generally parallel to said first slot,
- and clamping means including a member extending through said third slot for securing said radiation source in an adjusted position relative to said focusing means as controlled by said first and second camming means.

5. A reflex scanner for sensing self-generated radiation reflected from a target disposed at a substantial distance from said scanner comprising:
- a housing,
- a radiation source mounted in said housing,
- a tubular unit fixedly mounted in said housing including focusing means disposed in front of said radiation source and forming a parallel beam of rays from said source,
- and a sensing unit fixedly mounted in said tubular unit in front of said focusing means and coaxially therewith so that the radiation beam transmitted from said housing is annular in configuration,
- said sensing unit including a tubular shield structure having a closed radiation tight end adjacent said focusing means, a radiation sensor in said shield structure, an apertured plate disposed immediately in front of said sensor in said shield structure and a lens at the open end of said shield structure for focusing radiation reflected from a target outside of said housing onto said radiation sensor so that the field of view of said radiation sensor is restricted to an area substantially coincident with the area of the target illuminated by said beam of rays from said source and to a solid angle of less than 10° coaxial with said parallel beam.

6. A reflex scanner for sensing self-generated radiation reflected from a point disposed at a substantial distance from said scanner comprising:

a housing, a radiation source mounted in said housing, a tubular unit fixedly mounted in said housing including focusing means disposed in front of said radiation source and forming a parallel beam of rays from said source, a sensing unit fixedly mounted in said tubular unit in front of said focusing means and coaxially therewith so that the radiation beam transmitted from said housing is annular in configuration, said sensing unit including a tubular shield structure having a closed radiation tight end adjacent said focusing means, a radiation sensor in said shield structure, an apertured plate disposed immediately in front of said sensor in said shield structure and a lens at the open end of said shield structure for focusing radiation reflected from a point outside of said housing onto said radiation sensor so that the field of view of said radiation sensor is restricted to a solid angle of less than 10° coaxial with said parallel beam, and means to adjust the position of said radiation source relative to said focusing means including a source support member having a first elongated slot, a second elongated slot disposed at right angles to said first slot and a third elongated slot disposed paralle' to said second slot, first rotatable camming means engaging said first slot to produce movement of said radiation source in a direction generally parallel to said second slot, second rotatable camming means engaging said second slot to produce movement of said radiation source in a direction generally parallel to said first slot, and clamping means including a member extending through said third slot for securing said radiation source in an adjusted position as controlled by said first and second camming means.

7. The scanner as claimed in claim 6 wherein said housing has a wall portion hingedly mounted for pivoting movement outwardly from said housing and said support structure is mounted on said wall portion such that said source may be moved out of said housing by movement of said hinged wall portion to facilitate replacement of said radiation source.

8. A reflex scanner for generating a beam of light and sensing a portion of that light beam reflected by a remote target comprising:

a housing, a light source mounted in said housing, means disposed in front of said light source for forming radiation from said light source into a beam of light for transmission externally of said housing for impingement on a target spaced a substantial distance from said housing, said beam forming means being arranged to modify said radiation so that the rays in said beam of light transmitted externally of said housing betweeen said housing and said target are disposed in substantially parallel relation, and a sensor unit disposed in said housing in coaxial relation with respect to said beam of light, said sensor unit including a light sensor, and means for restricting the field of view of said sensor to an area substantially coincident with the area of the target illuminated by said transmitted beam of light.

References Cited

UNITED STATES PATENTS

| | | | |
|---|---|---|---|
| 2,437,848 | 3/1948 | Cooley | 240—44.2 X |
| 2,685,083 | 7/1954 | Beman | 250—230 X |
| 2,762,930 | 9/1956 | Onksen et al. | 250—239 X |
| 2,838,683 | 6/1958 | Munro | 250—227 |
| 3,214,596 | 10/1965 | Schwerdt et al. | 250—239 |
| 3,240,106 | 3/1966 | Hicks | 250—227 X |
| 3,247,391 | 4/1966 | Ogle et al. | 250—239 X |

RALPH G. NILSON, *Primary Examiner.*

M. A. LEAVITT, *Assistant Examiner.*